United States Patent
Wang

(10) Patent No.: US 10,574,625 B2
(45) Date of Patent: Feb. 25, 2020

(54) GENERATING SYSTEM PORT IDENTITY

(71) Applicant: HANGZHOU H3C TECHNOLOGIES CO., LTD., Hangzhou, Zhejiang (CN)

(72) Inventor: Minghui Wang, Beijing (CN)

(73) Assignee: Hewlett Packard Enterprise Development LP, Houston, TX (US)

(*) Notice: Subject to any disclaimer, the term of this patent is extended or adjusted under 35 U.S.C. 154(b) by 329 days.

(21) Appl. No.: 15/565,454

(22) PCT Filed: Apr. 15, 2016

(86) PCT No.: PCT/CN2016/079374
§ 371 (c)(1),
(2) Date: Oct. 10, 2017

(87) PCT Pub. No.: WO2016/165643
PCT Pub. Date: Oct. 20, 2016

(65) Prior Publication Data
US 2018/0124011 A1    May 3, 2018

(30) Foreign Application Priority Data
Apr. 17, 2015  (CN) .......................... 2015 1 0183894

(51) Int. Cl.
*H04L 29/12* (2006.01)
*H04L 12/935* (2013.01)
(Continued)

(52) U.S. Cl.
CPC .......... *H04L 61/20* (2013.01); *G06F 13/4022* (2013.01); *H04L 45/583* (2013.01); *H04L 49/30* (2013.01); *H04L 49/70* (2013.01)

(58) Field of Classification Search
CPC ....... H04L 61/20; H04L 45/583; H04L 49/70; H04L 49/30; H04L 49/15
See application file for complete search history.

(56) References Cited

U.S. PATENT DOCUMENTS 6,801,950 B1    10/2004   O'Keeffe et al.
2005/0044324 A1  2/2005   Rashid et al.
(Continued)

FOREIGN PATENT DOCUMENTS

CN       1825836        4/2006
CN     101296188 A      10/2008
(Continued)

OTHER PUBLICATIONS

"Installation Guide for Virtual Chassis Stacking". x510 Series. Allied Telesis, Inc. 2012. (Year: 2012).*
(Continued)

*Primary Examiner* — Thomas J. Cleary

(57) ABSTRACT

Various examples provide a method and apparatus of generating a system port identity. According to the method, a member device may determine a value c which is the number of unit IDs to be allocated to a chip in an interface board of the member device, c is larger than 1; generate a system port identity which identifies a port in the stack for each of plural first ports of the chip using a first unit ID of the c unit IDs; generate a system port identity for each of plural second ports of the chip other than the first ports using a second unit ID of the c unit IDs.

15 Claims, 3 Drawing Sheets

(51) Int. Cl.
*G06F 13/40* (2006.01)
*H04L 12/775* (2013.01)
*H04L 12/931* (2013.01)

(56) References Cited

U.S. PATENT DOCUMENTS

| | | | | |
|---|---|---|---|---|
| 2006/0092853 A1* | 5/2006 | Santoso | | H04L 45/583 370/252 |
| 2008/0301319 A1* | 12/2008 | Dernosek | | H04L 12/66 709/232 |
| 2010/0284414 A1* | 11/2010 | Agarwal | | H04L 49/351 370/401 |
| 2014/0025736 A1* | 1/2014 | Wang | | H04L 45/46 709/204 |
| 2014/0181275 A1* | 6/2014 | Lin | | H04L 41/0803 709/220 |
| 2015/0085704 A1* | 3/2015 | Kamble | | H04L 49/70 370/255 |

FOREIGN PATENT DOCUMENTS

| | | |
|---|---|---|
| CN | 101599900 A | 12/2009 |
| CN | 101662428 A | 3/2010 |
| CN | 103607351 A | 2/2014 |
| CN | 103763219 A | 4/2014 |
| WO | WO-2014059898 A1 | 4/2014 |

OTHER PUBLICATIONS

Wang et al, Abstract on "Research on Topology of NoC for Three Dimensional Multi-Core Microprocessors", Jan. 15, 2015, 80 pages.
Unknown, Stack Technology White Paper, Aug. 7, 2014, 21 pages, https://wenku.baidu.com/view/5a89f2567c66137ee0619d6.html
International Preliminary Report on Patentability received for PCT Patent Application No. PCT/CN2016/079374, dated Oct. 26, 2017, 5 pages.
International Searching Authority, International Search Report and Written Opinion. dated Jun. 29, 2016, PCT/CN2016/079374, 11 Pgs.

* cited by examiner

GENERATING SYSTEM PORT IDENTITY

BACKGROUND

Stacking refers to connecting plural devices, e.g., switching devices, via stack ports and configuring the plural devices properly to form a virtualized device. The virtualized device is referred to as a stack (or stacking device, stacking system), and each switching device in a stack is referred to as a member device. A member device may be a chassis-type device, providing a main control board and slots. Each slot can accept an interface board. The port density can be changed by adding interface boards. For example, a switching device serving as a member device may be capable of accepting 6 interface boards, each interface board may include 4 switching chips, and each chip can provide 64 non-aggregated ports. For another example, a switching device serving as a member device may be capable of accepting 16 interface boards, each interface board may include 6 switching chips, and each chip can provide 64 non-aggregated ports. Member devices of a stack may have different capabilities, i.e., having different port density.

BRIEF DESCRIPTION OF THE DRAWINGS

Features of the present disclosure are illustrated by way of example and not limited in the following figures, in which like numerals indicate like elements, in which.

DETAILED DESCRIPTIONS

Figure 1:
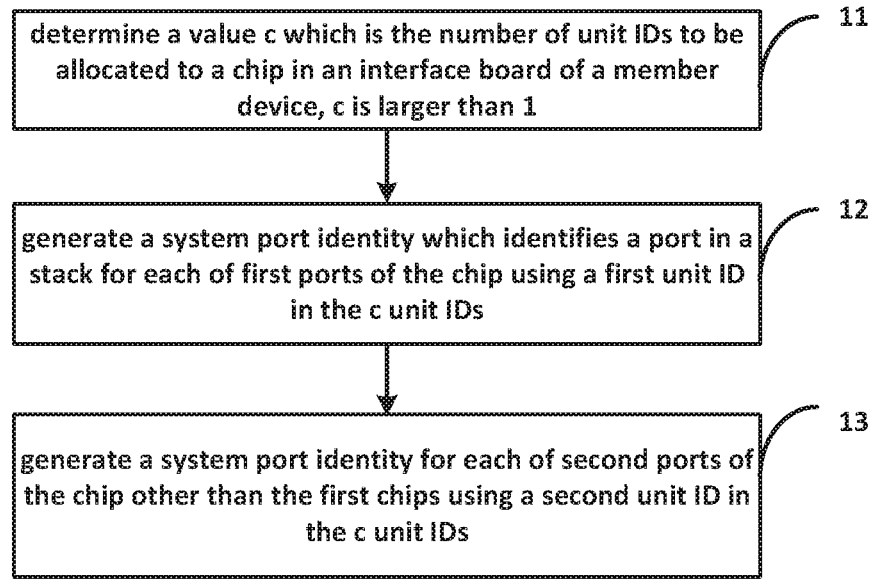
FIG. 1 is a flowchart illustrating a method of generating a system port identity in accordance with examples of the present disclosure.

In a stacking system, ports of each chip in each member device may generally be identified using global system ports (SysPort). The SysPort of an aggregated port (i.e., a physical port that is bundled with multiple other ports to form a trunk) may include a trunk identity and a member identity of the port in the trunk. Each chip in a member device may be allocated with a unit identity (unit ID), and the SysPort of a non-aggregated port (also referred to as individual port) of a chip may include the unit ID of the chip and a port identity (port ID). When each chip in the stack has one core, the maximum number of chips that can be supported by the stack may be determined by the number of digits of the unit ID (denoted by m), and the maximum number of ports that can be supported by each chip in the stack may be determined by the number of digits of the port ID (denoted by n). According to an example, if m is 8 and n is 6, the stack may support a maximum of $2^m=256$ chips, and each chip may support a maximum of $2^n=64$ non-aggregated ports (including external ports and internal ports).

When a member device includes chips having plural cores, each core of each chip may be allocated with a unit ID, and the unit IDs may become insufficient. For example, a stack including a switching device 1 and a switching device 2 may use a SysPort of 15 bits. Supposing the switching device 1 has 16 interface boards, each interface board is integrated with 6 dual core switching chips, and each dual core switching chip supports 64 non-aggregated ports; the switching device 2 has 16 interface boards, each interface board is integrated with 6 single core switching chips, and each single core switching chip supports 32 non-aggregated ports. The maximum number of ports supported by each chip in the stack may be the maximum number of non-aggregated ports supported by the chips, i.e., 64, which may require a 6-bit port ID. One bit of the SysPort may be used for specifying whether the port is an aggregated port or a non-aggregated port, and the number of digits of the unit ID may be 15−1−6=9, i.e., the stack may provide at most $2^8=256$ unit IDs. Since each core of each chip may require a unique unit ID, the 16 interface boards of the switching device 1 may require a total of 16*12=192 unit IDs, and the 16 interface boards of the switching device 2 may require a total of 16*6=96 unit IDs, i.e., requiring a total of 192+96=288 unit IDs. However, there are at most 256 unit IDs available, which makes it impossible to stack the switching device 1 with the switching device 2.

Various examples of the present disclosure provide a method of generating a system port identity. FIG. 1 is a flowchart illustrating a method 10 of generating a system port identity in accordance with examples of the present disclosure. The method 10 may include the following procedures.

At block 11, a member device of a stack may determine a value c which is the number of unit IDs to be allocated to a chip in an interface board of the member device, and c is larger than 1.

At block 12, the member device may generate a system port ID identifying a port in the stack for each of plural first ports of the chip using a first unit ID of the c unit IDs.

At block 13, the member device may generate a system port ID for each of plural second ports of the chip other than the first ports using a second unit ID of the c unit IDs.

According to various examples, a member device may generate system port IDs of ports of a chip using different unit IDs, which may reduce the number of ports corresponding to each unit ID. Therefore, the member device is enabled to support a SysPort format which has relatively less bits for port IL) and relatively more bits for unit ID, and the stacking system can provide more unit IDs and thus can stack more member devices.

For example, a chip in a member device may have 4 cores and 64 non-aggregated ports. The member device may obtain 4 unit IDs from unit IDs available in the stack, and divide the 64 non-aggregated ports into two groups. The member device may bundle the 4 cores with the 4 unit IDs respectively, and generate system port IDs of non-aggregated ports in each of the two groups using a unit ID of a core, i.e., 2 of the 4 unit IDs are used for generating the system port IDs of ports of the chip. If each group includes 32 ports, the member device may support a SysPort format having a port ID of 5 bits. For example, if the SysPort has 15 bits which include one bit for specifying whether the port is an aggregated port or a non-aggregated port and 5 bits for port ID, the SysPort format may provide a unit ID of 15−1−5=9 bits, thus can provide a total of $2^9=512$ unit IDs.

In various examples, a member device may generate system port IDs of ports of a multi-core chip using unit IDs of different cores. In an example, when c equals k which is the number of cores of the chip and k is larger than 1, each of the k unit IDs may be used for identifying one of the k cores of the chip. The unit ID of a first core of the k cores may be used for generating the system port IDs of plural first ports, and the unit ID of a second core of the k cores may be used for generating the system port IDs of plural second ports other than the first ports. The first ports and the second ports may be non-aggregated ports of the chip.

In an example, the member device may divide non-aggregated ports of the chip into k groups, and each group includes a total of p/k non-aggregated ports. The p is the total number of non-aggregated ports of the chip. The member device may use each of the k unit IDs to generate the system port IDs of p/k non-aggregated ports in one of the k groups.

According to various examples, the member device may support a system port ID which includes a n-bit port ID, and $$n = \log_2\left(\frac{p}{k}\right).$$

The p is the total number of non-aggregated ports of the chip, and k is the total number of cores of the chip. The system port ID may include m bits for unit ID, m=d−n−1, and d is the total number of bits of the system port ID.

For example, a chip in a member device may have 4 cores and 64 non-aggregated ports. The member device may obtain 4 unit IDs from unit IDs available in the stack, and divide the non-aggregated ports into 4 groups. The member device may use each of the 4 unit IDs to generate the system port IDs of 16 non-aggregated ports in one of the 4 groups. The member device may support a SysPort format which includes a port ID of $$\log_2\left(\frac{64}{4}\right) = 4 \text{ bits.}$$

For example, if the SysPort has 15 bits which include one bit for specifying whether the port is an aggregated port or a non-aggregated port and 4 bits for port ID, the SysPort format may provide a unit ID of 15−1−4=10 bits, thus can provide a total of $2^{10}$=1024 unit IDs.

According to various examples, unit IDs allocated to a chip by a member device may outnumber the cores of the chip. In an example, when the number of unit IDs (denoted by c) is larger than the number of cores of the chip (denoted by k), k third unit IDs out of the c unit IDs may be used for identifying the k cores of the chip. A first unit ID of the third unit IDs may be used for generating the system port IDs of plural external ports of the chip, and a second unit ID other than the third unit IDs in the c unit IDs may be used for generating the system port IDs of plural internal ports of the chip.

An external port refers to a port through which the member device communicates with another device, i.e., the external port is identifiable to a device external to the member device. An internal port refers to a port used within the member device, e.g., a clock port, or the like. An internal port is unidentifiable to another device external to the member device.

According to examples, the member device may use a system port ID which includes a port ID of n bits, and $$n = \log_2\left(\frac{p}{k}\right) - 1.$$

The p is the total number of non-aggregated ports of the chip, and k is the total number of cores of the chip. The system port ID may include a unit ID of m bits, m=d−n−1, and d is the total number of bits of the system port ID.

For example, a chip in a member device has 1 core, i.e., the chip is a single core chip, and has 64 non-aggregated ports of which 32 are external ports and 32 are internal ports. The member device may obtain 2 unit IDs from unit IDs available in the stack, and divide the 64 non-aggregated ports into two groups. The member device may generate the system port IDs of 32 non-aggregated ports in a first group of the 2 groups using a first unit ID of the 2 unit IDs, and generate the system port IDs of 32 non-aggregated ports in a second group of the 2 groups using a second unit ID of the 2 unit IDs. The member device may support a SysPort format which includes a port ID of $$\log_2\left(\frac{64}{1}\right) - 1 = 5 \text{ bits.}$$

For example, if the SysPort has 15 bits which include one bit for specifying whether the port is an aggregated port or a non-aggregated port and 5 bits for port ID, the SysPort format may provide a unit ID of 15−1−5=9 bits, i.e., can provide a total of =512 unit IDs.

According to various examples, member devices of a stack may adopt different manners of generating system port identities. For example, a member device 1 may include a chip having 4 cores and 64 non-aggregated ports, may obtain 4 unit IDs and can support a SysPort format with a 5-bit port ID; a member device 2 may include a chip having 2 cores and 64 non-aggregated ports, may obtain 2 unit IDs and support a SysPort format with a 5-bit port ID; a member device 3 may include a chip having one core and 64 non-aggregated port, may obtain 2 unit IDs and can support a SysPort format with a 5-bit port ID. As such, the stack may adopt a SysPort format with a 5-bit port ID. In an example where the above SysPort having 15 bits is used, the stack can provide a total of 512 unit IDs, According to various examples, when allocating unit IDs to a chip, the member device may identify the number k of cores of the chip; when p/k is smaller than or equal to $2^n$, determine the number of unit IDs c=k; when p/k is larger than $2^n$, determine c=2k. $2^n$ is smaller than or equal to a pre-determined maximum number of non-aggregated ports allowed to be supported by a chip in the stack.

According to various examples, the member device may check whether there are c unoccupied unit IDs in unit IDs allocated to the member device; select c unoccupied unit IDs from the unit IDs allocated to the member device and allocate the selected c unit IDs to the chip if there are c unoccupied unit IDs; and inhibit an interface board that includes the chip from starting up if there are not c unoccupied unit IDs.

Figure 2:
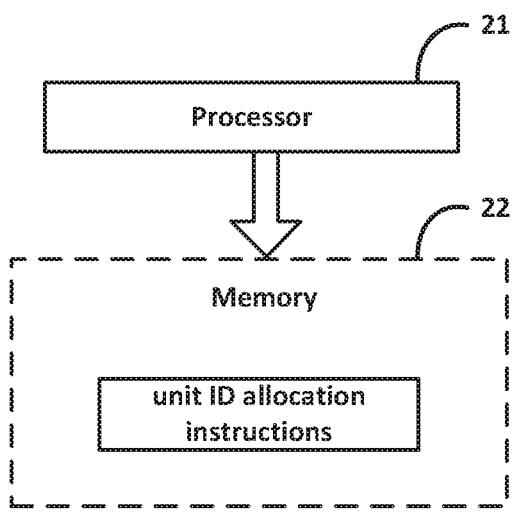
FIG. 2 is a schematic diagram illustrating a member device in accordance with examples of the present disclosure.

According to various examples, the member device may include a chassis, slots and interface boards inserted into the slots. As shown in FIG. 2, the member device may include a processor 21 and non-transitory storage medium, e.g., memory 22. The memory 22 may store machine-readable instructions for allocating unit IDs. The instructions may cause the processor 21 to:

determine c which is the number of unit IDs to be allocated to a chip in an interface board of a member device in a stack, and c is larger than 1;

generate a system port ID identifying a port in the stack for each of plural first ports of the chip using a first unit ID of the c unit IDs; and generate a system port ID identifying a port in the stack for each of plural second ports of the chip other than the first ports using a second unit ID of the c unit IDs.

Figure 3:
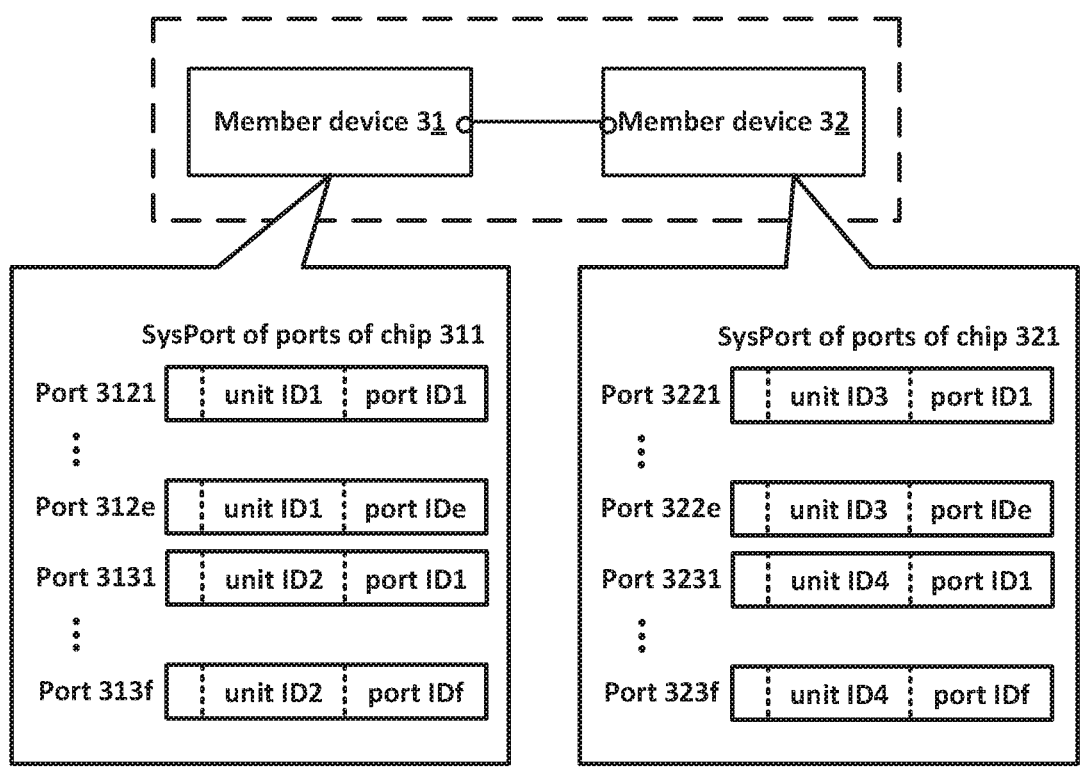
FIG. 3 is a schematic diagram illustrating a stack in accordance with examples of the present disclosure.

FIG. 3 is a schematic diagram illustrating a stack 30 in accordance with examples of the present disclosure. The stack 30 may include a member device 31 and a member device 32. The example of FIG. 3 takes two member devices in a stack as an example. In other examples, a stack may include plural member devices.

The member device 31 may obtain c1 unit IDs of the stack, and c1 is the number of the obtained unit IDs, A unit ID 1 in the c1 unit ID s may be used for generating the system port ID of plural first ports 3121~312e of a chip 311 in the member device 31, and a unit ID 2 in the c1 unit IDs may be used for generating the system port ID of plural second ports 3131~313f of the chip 311.

The member device 32 may obtain c2 unit IDs of the stack, and c2 is the number of the obtained unit IDs. A unit ID 3 in the c2 unit IDs may be used for generating the system port ID of plural third ports 3221~322e of a chip 321 in the member device 32, and a unit ID 4 in the c2 unit IDs may be used for generating the system port ID of plural fourth ports 3231~323f of the chip 321.

Figure 4:
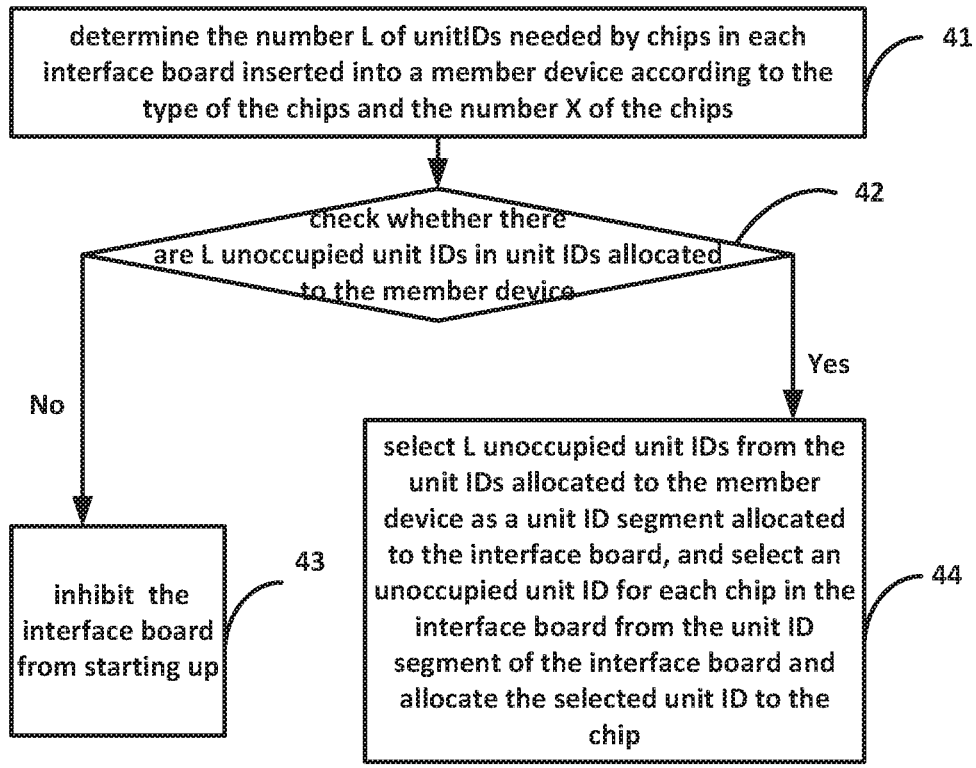
FIG. 4 is a flowchart illustrating a method of allocating unit IDs to an interface board of a member device in accordance with examples of the present disclosure.

According to various examples, unit IDs may be allocated to an interface board inserted in to the member device by a main board in the member device or by another device. An interface board may include one or plural chips. FIG. 4 is a flowchart illustrating a method 40 of allocating unit IDs to an interface board in accordance with examples of the present disclosure. The method 40 may include the following procedures.

At block 41, a member device in a stack may determine a value L which is the number of unit IDs to be allocated to each interface board inserted into the member device according to the type of chips and the number X of chips in the interface board.

At block 42, the member device may check whether there are L unoccupied unit IDs in unit IDs allocated to the member device, perform the procedure in block 43 if there are not L unoccupied unit IDs, or perform the procedure in block 44 if there are L unoccupied unit IDs.

At block 43, the member device may inhibit the interface board from starting up.

At block 44, the member device may select L unoccupied unit IDs from the unit IDs allocated to the member device as a unit ID segment allocated to the interface board, select unoccupied unit IDs from the unit ID segment of the interface board for each chip in the interface board and allocate the selected unit IDs to the chip.

In various examples, unit IDs allocated to the member device may be one of N sets of available unit IDs available in the stack. The N is the total number of member devices in the stack. The number of available unit IDs may be determined based on a rule that one unit ID corresponds to $2^n$ non-aggregated ports $a/2 \leq 2^n \leq a$, a is a pre-determined maximum number of non-aggregated ports corresponding to each core among all of chips in interface boards of member devices in the stack.

In an example, the member device may determine each core of a chip corresponds to b non-aggregated ports; determine L to be 2k times of X if b is larger than $2^n$; determine L to be k times of X if b is smaller than or equal to $2^n$. The k is the number of cores in the chip.

For example, if an interface board may include single core chips and dual core chips, the procedure in block 41 may include the following procedures a1 to a3.

In procedure a1, it may be identified whether chips in the interface board are single core chips or dual core chips, the procedure a2 may be performed if the chips are single core chips, and the procedure a3 may be performed if the chips are dual core chips.

In procedure a2, it may be determined the L to be the X if the number of non-aggregated ports of the chip in the interface board is smaller than or equal to $2^n$, or it may be determined the L to be two times of the X if the number of non-aggregated ports of the chip is larger than $2^n$.

The procedure a2 may be performed when the chips are single core chips.

The $2^n$ in procedure a2 is described in the following.

In procedure a3, it may be determined that the L is two times of the X.

The procedure a3 may be performed when the chips are dual core chips.

The number L of unit IDs to be allocated to the interface board may be determined through procedures a$a$ to a3.

According to various examples, in procedure 42, the unit IDs allocated to the member device may be determined by dividing unit IDs in the stack into N groups, and each of the N group may be allocated to one of N member devices. The N is the total number of member devices in the stack.

The unit IDs available in the stack refers to the total number of available unit IDs within the stack, and is determined based on a rule that one unit ID corresponds to $2^n$ non-aggregated ports.

In an example, an unit ID corresponds to $2^n$ non-aggregated ports, that is, in order to effectively satisfy the requirements of stacking devices, it is no longer ruled the number of available unit IDs in the stack to be determined by the maximum number of non-aggregated ports supported by a chip among the chips of member devices in the stack. Instead, it may be defined that one unit ID always corresponds to $2^n$ non-aggregated ports, e.g., the number of available unit IDs in the stack may not exceed $2^{14}/2^n$ according to the above example which adopts the 15-bit SysPort format.

In an example, the value range of $2^n$ may be: $a/2 \leq 2^n \leq a$. The a may be a pre-determined maximum number of non-aggregated ports allowed to be supported by a chip in an interface board of a member device in the stack. For example, it may be pre-defined the maximum number of non-aggregated ports supported by a chip in an interface board of a member device in the stack is 64, and the value of $2^n$ may be 32. Since the number of non-aggregated ports supported by a chip may generally be at most 64 and at least 32, the value of $2^n$ may be 32.

According to the above example, there are only SysPorts allocated to non-aggregated ports. If $2^n$ is $2^5$, i.e., one unit ID corresponds to $2^5$ non-aggregated ports, the number of the above available unit IDs is $2^{14}/2^5=512$, and 512 unit IDs can provide a more favorable condition for stacking of devices.

According to various examples, the above available unit IDs may be divided into N groups which are allocated to N member devices respectively. The allocation may be enabled through static configuration, or may be implemented in a dynamic manner. For example, the dynamic manner may include:

dividing all of available unit IDs into N groups;

numbering the N groups of unit IDs in the same manner the N member devices in the stack are numbered;

allocating each group of unit IDs to a member device which has a serial number corresponding to the serial number of the group, For example, in a stack of 4 devices, taking $2^5$ as $2^n$ in the example, according to the above description, the 512 unit IDs may be divided evenly into 4 groups which include the same number of unit IDs, i.e., 128 unit IDs. The first group may include unit IDs ranging from 0 to 127, the second group from 128 to 155, the third group from 256 to 383, and the fourth group from 384 to 511. After that, the 4 groups may be numbered in the same manner the 4 member devices in the stack are numbered. As a result, the first group (unit IDs from 0 to 127) may be allocated to the first device, the second group (unit IDs from 128 to 255) may be allocated to the second device, the third group (unit IDs from 256 to 383) may be allocated to the third device, and the fourth group (unit IDs from 384 to 511) may be allocated to the fourth device.

The procedure in block 23 may be performed after it is determined there are not unoccupied unit IDs in block 22. When it is determined there are not L unoccupied unit IDs in block 22, it means there are not sufficient unit IDs for the interface board, and the interface board cannot function if no unit ID is allocated. Therefore, the interface board may be inhibited from starting up.

The procedure in block 44 may be performed after it is determined there are L unoccupied unit IDs in block 42.

According to various examples, after selecting unit IDs to allocate to the chip from the unit ID seament allocated to the interface board in block 44, the member device may mark the unit IDs in the unit ID segment as occupied to specify which unit IDs are occupied and which unit IDs are unoccupied, so that the member device will not allocate the unit IDs to another chip.

At block 44, for each chip in the interface board, unoccupied unit IDs to be allocated to the chip may be selected from the unit ID segment allocated to the interface board according to the type of the chip, e.g., a single core chip, a dual core chip, multi-core chip, or the like.

In an example, the type of a chip in the interface board may be dual core, i.e., the chip is a dual core chip.

The procedure in block 44 of selecting unoccupied unit IDs from the unit ID segment allocated to the interface board and allocating the selected unit IDs to the chip may include:
selecting two unoccupied from the unit ID segment allocated to the interface board;
0allocating one of the two selected unit IDs to one core of the dual core chip, and
allocating the other of the two selected unit IDs to the other core of the dual core chip.

In various examples, after unit IDs are allocated to the dual core chip in the member device, the following procedures may be performed for the dual core chip.

In procedure b1, a portion which includes less than $2^n$ non-aggregated ports of the dual core chip may be bundled to one core of the dual core chip in a pre-determined manner, and the other non-aggregated ports of the dual core chip may he bundled to the other core of the dual core chip.

In various examples, the value range of $2^n$ may be $a/2 \leq 2^n \leq a$. The a may be a pre-determined maximum number of non-aggregated ports allowed to be supported by a chip in an interface board of a member device in the stack. Even if the chip is a dual core chip, the maximum number of non-aggregated ports supported by the chip may not exceed two times of $2^n$. Thus, the number of non-aggregated ports bundled to each of the two cores in procedure hi may not exceed $2^n$.

In an example, the pre-determined manner of bundling the ports to the cores may be a load-balancing manner. Taking $2^5$ as an example of $2^n$, supposing a dual core chip has 64 non-aggregated ports and two cores respectively denoted by core 1 and core 2, 32 of the 64 non-aggregated ports may be bundled to the core 1, and the other 32 of the 64 non-aggregated ports may be bundled to the core 2.

In procedure b2, for each non-aggregated port bundled to a core of the dual core chip, a SysPort of the non-aggregated port may be generated according to a pre-determined first SysPort mapping method.

The first SysPort mapping method may be as shown in formula 1:

$$\text{Sysport} = \text{unit id1} << n + \text{port id1};\quad\quad\text{(formula 1)}$$

In formula 1, the unit id1 denotes the unit ID allocated to the core, the port id1 denotes the port ID of the non-aggregated port bundled to the core, and << denotes moving leftwards.

Taking $2^5$ as an example of $2^n$, supposing a dual core chip has 64 non-aggregated ports and two cores respectively denoted by core 1 and core 2, non-aggregated ports 0 to 31, i.e., a group of a total of 32 ports, may be bundled to core 1, and non-aggregated ports 32 to 63, i.e., another group of a total of 32 ports, may be bundled to core 2. The unit ID allocated to core 1 may be unit ID 1 (i.e., 0001 in binary form), and the unit ID allocated to core 2 may be unit ID 2 (i.e., 0010 in binary form). Taking non-aggregated ports bundled to core 1 whose unit ID is 0001 as an example, according to formula 1, the unit ID 1 (i.e., 0001) allocated to the core 1 may first be moved leftwards by 5 positions to obtain 000100000 (denoted as result 1), and the result 1 may be added to the serial number of the non-aggregated port (the binary form is 0001) to obtain 000100001 (denoted by result 2). As such, the SysPort of the non-aggregated port 0001 bundled to the core 1 is 000100001 (i.e., the result 2).

For example, when $2^n$ is $2^5$, n is 5, it is supposed that 4 devices are stacked and the serial numbers of the 4 devices are 01 to 04 respectively. The member device whose serial number is 01 is referred to as member device 01, the member device whose serial number is 02 is referred to as member device 02, the member device whose serial number is 03 is referred to as member device 03, the member device whose serial number is 04 is referred to as member device 04.

According to the above method of allocating unit IDs to a member device in a stack, 512 unit IDs may be divided evenly into 4 groups, and each group may include 128 unit IDs. The first group may include unit IDs 0 to 127, the second group may include unit IDs 128 to 255, the third group may include unit IDs 256 to 383, and the fourth group may include unit IDs 384 to 511. After that, the four groups of unit IDs may be numbered according to the manner the 4 member devices in the stack are numbered. In an example, the first group may be numbered as 01, the second group may be numbered as 02,the third group may be numbered as 03, and the fourth group may be numbered as 04.

Unit IDs in the first group may be allocated to member device 01, unit IDs in the second group may be allocated to member device 02, unit IDs in the third group may be allocated to member device 03, and unit IDs in the fourth group may be allocated to member device 04.

The following takes an interface board 01 inserted into member device 01 as an example, and the mechanism may be applicable to other interface boards in the member device 01 and interface boards in the member devices 02 to 04.

Supposing the interface board 01 includes 8 dual core chips, the member device 01 may determine the total number of unit IDs required by the interface board 01 is 16 according to the above block 41.

The member device 01 may check whether the first group of unit IDs (including unit IDs 0~127) allocated to the member device 01 include 16 unoccupied unit IDs.

After detecting the first group of unit IDs (unit IDs 0~127) includes 16 unoccupied unit IDs, the member device 01 may select 16 unoccupied unit IDs as a unit ID segment allocated to the interface board 01, and mark the 16 selected unit IDs as occupied. It is supposed the 16 selected unit IDs are unit IDs 0 to 15.

The member device 01 may select two unoccupied unit IDs from the unit ID segment allocated to the interface board 01 for each dual core chip in the interface board 01, and allocate the two unoccupied unit IDs to the dual core chip. For example, unit IDs 0 and 1 may be allocated to a first dual core chip (whose serial number is 1) in the interface board 01, unit IDs 2 and 3 may be allocated to a second dual core chip (whose serial number is 2) in the interface board 01, unit IDs 4 and 5 may be allocated to a third dual core chip (whose serial number is 3) in the interface board 01, and etc., until unit IDs 14 and 15 may be allocated to the eighth dual core chip (whose serial number is 8) in the interface board 01.

Supposing the dual core chips in the interface board 01 have the same number of non-aggregated ports, e.g., 64 aggregated ports, for each dual core chip in the interface board 01, the member device 01 may bundle 32 first non-aggregated ports (serial numbers are 0 to 31) of the dual core chip with a first core of the dual core chip and bundle 32 second non-aggregated ports (serial numbers are 31 to 63) of the dual core chip with a second core of the dual core chip according to a pre-determined method, e.g., load-balancing.

After that, the SysPort may be generated for each of the non-aggregated ports bundled with the cores of the dual core chip in the interface board 01 according to the above formula 1.

Through the above process, unit IDs may be allocated to the member devices 01 to 04, and the allocated unit IDs are fewer than 512, thus the devices can be stacked, i.e., stacking of the devices can be implemented.

In various examples, the type of a chip in the interface board is single core, i.e., the chip is a single core chip.

The procedure in block 44 of selecting unoccupied unit IDs from the unit ID segment allocated to the interface board and allocating the selected unit IDs to the chip may include the following procedures.

In procedure c1, if the number of non-aggregated ports of the single core chip is smaller or equal to $2^n$, the procure c2 may be performed; if the number of non-aggregated ports of the single core chip is larger than $2^n$, the procedure c3 may be performed.

In procedure c2, an unoccupied unit ID is selected from a unit ID segment allocated to the interface board and is allocated to the single core chip.

The procedure c2 may be performed when the number of non-aggregated ports of the single core chip is smaller than or equal to $2^n$.

In procedure c3, two unoccupied adjacent unit IDs may be selected from a unit ID segment allocated to the interface board and allocated to the single core chip. One of the two selected unit iDs may be an even number, and the other may be an odd number.

The procedure c3 may be performed when the number of non-aggregated ports of the single core chip is larger than $2^n$.

According to various examples, after allocating the unit IDs to the single core chip in a member device, a SysPort may be generated for each non-aggregated port of the single core chip based on that a unit ID corresponds to $2^n$ non-aggregated ports.

For example, if the number of non-aggregated ports of the single core chip is smaller than or equal to $2^n$, the SysPort of each non-aggregated port of the single core chip may be generated using a pre-determined second SysPort mapping method.

If the number of non-aggregated ports of the single core chip is larger than $2^n$, the SysPort of $2^n$ non-aggregated ports of the single core chip may be generated according to a pre-determined third SysPort mapping method, and the SysPort of the other non-aggregated ports except the non-aggregated ports may be generated according to a pre-determined fourth SysPort mapping method.

The second SysPort mapping method may be as shown in the following formula 2.

$$Sysport = unit\ id2 << n + port\ id2; \qquad \text{(formula 2)}$$

The third SysPort mapping method may be as shown in the following formula 3:

$$Sysport = unit\ id3 << n + port\ id3; \qquad \text{(formula 3)}$$

The fourth SysPort mapping method may be as shown in the following formula 4:

$$Sysport = unit\ id4 << n + port\ id4; \qquad \text{(formula 4)}$$

The unit id2 in the formula 2 denotes the unit ID allocated to the single core chip, the port id2 denotes a port ID of a non-aggregated port of the single core chip; the unit id3 in the formula 3 denotes a unit ID which is an even number and allocated to the single core chip, the port id3 denotes a unit ID which is an odd number and allocated to the single core chip; the unit id4 in the formula 4 denotes a unit ID which is an odd number and allocated to the single core chip, the port id4 denotes a difference obtained by subtracting $2^n$ from a port id of a non-aggregated port; and the "<<" in formula 2 to 4 has the same meaning with the "<<" in formula 1, representing moving leftwards.

For example, when $2^n$ is $2^5$, n is 5, it is supposed that 4 devices are stacked whose serial numbers are 11 to 14 respectively. The member device whose serial number is 11 may be referred to as member device 11, the member device whose serial number is 12 may be referred to as member device 12, the member device whose serial number is 13 may be referred to as member device 13, the member device whose serial number is 14 may be referred to as member device 14.

According to the above method of allocating unit IDs to a member device in a stack, 512 unit IDs may be divided evenly into 4 groups, and each group may include 128 unit IDs. The first group may include unit IDs 0 to 127, the second group may include unit IDs 128 to 255, the third group may include unit IDs 256 to 383, and the fourth group may include unit IDs 384 to 511. After that, the four groups of unit IDs may be numbered according to the manner the 4 member devices in the stack are numbered. In an example, the first group may be numbered as 11, the second group may be numbered as 12, the third group may be numbered as 13, and the fourth group may be numbered as 14.

Unit IDs in the first group may be allocated to member device 11, unit IDs in the second group may be allocated to member device 12, unit IDs in the third group may be allocated to member device 13, and unit IDs in the fourth group may be allocated to member device 14.

The following takes an interface board 11 inserted into the member device 11 as an example, and the mechanism may be applicable to other interface boards in the member device 11 and interface boards in the member devices 12 to 14.

Supposing a single core chip in the interface board 11 has more than 32 non-aggregated ports, e.g., has 64 non-aggregated ports, and the interface board 11 includes 8 single core chip, the member device 11 may determine the interface board 11 needs a total of 16 unit IDs according to the block 41.

The member device 11 may check whether the first group of unit IDs (including unit IDs 0~127) allocated to the member device 11 include 16 unoccupied unit IDs.

After detecting the first group of unit IDs (unit IDs 0~127) includes 16 unoccupied unit IDs, the member device 11 may select 16 unoccupied unit IDs as a unit ID segment allocated to the interface board 11, and mark the 16 selected unit IDs as occupied. It is supposed the 16 selected unit IDs are unit IDs 0 to 15.

The member device 11 may select unoccupied unit IDs from the unit ID segment allocated to the interface board 11 for each single core chip in the interface board 11, and allocate the selected unoccupied unit IDs to the single core chip. For example, unit IDs 0 and 1 may be allocated to a first single core chip (whose serial number is 1) in the interface board 11, unit IDs 2 and 3 may be allocated to a second single core chip (whose serial number is 2) in the interface board 11, unit IDs 4 and 5 may be allocated to a third single core chip (whose serial number is 3) in the interface board 11, and etc., until unit IDs 14 and 15 may be allocated to the eighth single core chip (whose serial number is 8) in the interface board 11.

After that, the SysPort may be generated for each non-aggregated port of the single core chip in the interface board 11 according to the above formula 3 and formula 4.

In an example, supposing the number of non-aggregated ports of a single core chip in the interface board 11 is less than or equal to 32, e.g., 32, and the interface board 11 includes 8 single core chip, the member device 11 may determine the interface board 11 needs a total of 8 unit IDs according to the procedure in block 41.

The member device 11 may check whether the first group of unit IDs (including unit IDs 0~127) allocated to the member device 11 include 8 unoccupied unit IDs.

After detecting the first group of unit IDs (unit IDs 0~127) includes 8 unoccupied unit IDs, the member device 11 may select 8 unoccupied unit IDs as a unit ID segment allocated to the interface board 11, and mark the 16 selected unit IDs as occupied. It is supposed the 8 selected unit IDs are unit IDs 0 to 7.

The member device 11 may select an unoccupied unit ID from the unit ID segment allocated to the interface board 11 for each single core chip in the interface board 11, and allocate the selected unoccupied unit ID to the single core chip. For example, unit ID 0 may be allocated to a first single core chip (whose serial number is 1) in the interface board 11, unit ID 1 may be allocated to a second single core chip (whose serial number is 2) in the interface board 11, unit ID 3 may be allocated to a third single core chip (whose serial number is 3) in the interface board 11, and etc., until unit ID 7 may be allocated to the eighth single core chip (whose serial number is 8) in the interface board 11.

After that, the SysPort of each non-aggregated port bundled with each core of the single core chip in the interface board 11 may be generated according to the above formula 2.

Through the above process, unit IDs may be allocated to the member device 11 to the member device 14, and the allocated unit IDs are fewer than 512, thus the devices can be stacked, i.e., stacking of devices can be implemented.

Figure 5:
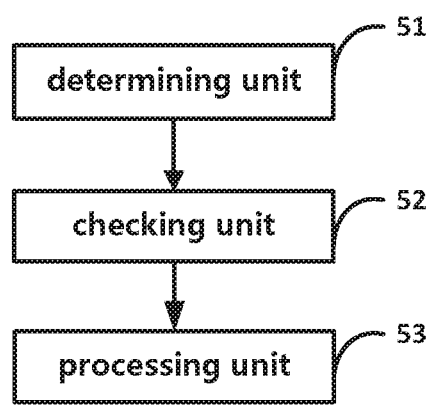
FIG. 5 is a schematic diagram illustrating an apparatus in accordance with examples of the present disclosure.

FIG. 5 is a schematic diagram illustrating an apparatus 50 in accordance with examples of the present disclosure. The apparatus 50 may be applied to a member device in a stack. The apparatus 50 may include the following components.

A determining unit 51 may determine a value L which is the number of unit IDs to be allocated to each interface board inserted into the member device according to the type of chips and the number X of chips in the interface board.

A checking unit 52 may check whether there are L unoccupied unit IDs in unit IDs allocated to the member device.

A processing unit 3 may select L unoccupied unit IDs from the unit IDs allocated to the member device and allocate the L unoccupied unit IDs to the interface board if the checking unit determines there are L unoccupied unit IDs. The processing unit 3 may select an occupied unit ID for each chip in the interface board from the unit IDs allocated to the interface board. The processing unit 3 may inhibit the interface board from starting up if the checking unit determines there are not L unoccupied unit IDs.

According to various examples, unit IDs allocated to the member device may be allocated by dividing available unit IDs into N groups and allocating the N groups to N member devices respectively.

The N may be the total number of member devices in the stack. The number of available unit IDs may be determined based on a rule that one unit ID corresponds $2^n$ non-aggregated ports, and $a/2 \leq 2^n \leq a$. The a is a pre-determined maximum number of non-aggregated ports allowed to be supported by a chip in an interface board of a member device in the stack.

A determining unit 51 may:

identify whether a chip in an interface board is a single core chip or a dual core chip, determine the L to be X if the number of non-aggregated ports of the chip in the interface board is smaller than or equal to $2^n$, or determine the L to be two times of the X if the number of non-aggregated ports of the chip is larger than $2^n$;

determine the L is two times of the X if the chip is a dual core chip.

According to various examples, the chip in the interface board is a dual core chip, and the processing unit 63 may select two unoccupied unit IDs from the unit ID segment allocated to the interface board;

allocate one of the selected unit IDs to one core of the dual core chip, and allocate the other of the selected unit IDs to the other core of the dual core chip.

According to various examples, a portion of non-aggregated ports of the dual core chip whose amount is less than $2^n$ may be bundled to one core of the dual core chip in a pre-determined manner, and the other non-aggregated ports of the dual core chip may be bundled to the other core of the dual core chip.

For each non-aggregated port bundled to each core of the dual core chip, a SysPort of the non-aggregated port may be generated according to a pre-determined first SysPort mapping manner. The first SysPort mapping manner may be: Sysport=unit id1<<"+port id1.

The unit id1 may denote the unit ID allocated to the core, the port id1 may denote the port ID of the non-aggregated port bundled to the core allocated with unit id1, and << may denote moving leftwards.

According to various examples, if the chip in the interface board is a single core chip, the processing unit 53 may select an unoccupied unit ID from the unit ID segment allocated to the interface board and allocate the selected unit ID to the single core chip if the number of non-aggregated ports of the single core chip is smaller than or equal to $2^n$;

select two unoccupied adjacent unit IDs from the unit ID segment allocated to the interface board and allocate the selected unit IDs to the single core chip. One of the two selected unit IDs may be an even number, and the other may be an odd number.

In an example, the processing unit 53 may generate the SysPort of each non-aggregated port of the single core chip using a pre-determined second SysPort mapping method if the number of non-aggregated ports of the single core chip is smaller than or equal to $2^n$;

generate the SysPort of $2^n$ non-aggregated ports of the single core chip according to a pre-determined third SysPort mapping method and generate the SysPort of the other non-aggregated ports except the $2^n$ non-aggregated ports according to a pre-determined fourth SysPort mapping method if the number of non-aggregated ports of the single core chip is larger than $2^n$;

the second SysPort mapping method may be: Sysport=unit id2<<$^n$+port id2;

the third SysPort mapping method may be: Sysport=unit id3<<$^n$+port id3;

the fourth SysPort mapping method may be: Sysport=unit id4<<$^n$+port id4.

The unit id2 may denote the unit ID allocated to the single core chip, the port id2 may denote the port ID of a non-aggregated port, the unit id3 may denote the unit ID which is allocated to the single core chip and is an even number, the port id3 may denote a port ID of a non-aggregated port; the unit id4 may denote the unit ID which is allocated to the single core chip and is an odd number, the port id.4 may denote a difference obtained by subtracting $2^n$ from a port ID of a non-aggregated port, and << may denote moving leftwards.

It should be understood that in the above processes and structures, not all of the procedures and modules are necessary. Certain procedures or modules may be omitted according to the needs. The order of the procedures is not fixed, and can be adjusted according to the needs. The modules are defined based on function simply for facilitating description. In implementation, a module may be implemented by multiple modules, and functions of multiple modules may be implemented by the same module. The modules may reside in the same device or distribute in different devices. The "first", "second" in the above descriptions are merely for distinguishing two similar objects, and have no substantial meanings.

The hardware modules according to various examples may be implemented by hardware or a hardware platform with necessary software. The software may include machine-readable instructions which are stored in a non-transitory storage medium. Thus, the examples may be embodied as software products.

In various examples, the hardware may be dedicated hardware or general-purpose hardware executing machine-readable instructions. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by machine-readable instructions to perform certain operations.

The machine-readable instructions corresponding to the modules may cause an operating system running in a computer to implement part or all of the operations described herein. A non-transitory computer-readable storage medium may be a storage device in an extension board inserted in the computer or a storage in an extension unit connected to the computer. In this example, a CPU in the extension board or the extension unit executes at least part of the operations according to the instructions based on the program codes to realize the technical scheme of any of the above examples.

The non-transitory computer-readable storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. In various examples, the program code may be downloaded from a server computer via a communication network.

The scope of the claims should not be limited by the embodiments set forth in the examples, but should he given the broadest interpretation consistent with the description as a whole.

The invention claimed is:

1. A method of generating a system port identity, applicable to a member device in a stack, comprising:
    determining, by a member device, a value c which is the number of unit identities (ID) to be allocated to a chip in an interface board in the member device, wherein c is larger than 1;
    generating, by the member device, a system port identity which identifies a port in the stack for each of plural first ports of the chip using a first unit ID in the c unit IDs; and
    generating, by the member device, a system port identity for each of plural second ports of the chip other than the first ports using a second unit ID in the c unit IDs.

2. The method of claim 1, further comprising:
    identifying k cores of the chip using the c unit IDs respectively if c equals k which is the number of cores of the chip;
    wherein the first unit ID is a unit ID of a first core in the k cores, the second unit ID is a unit ID of a second core in the k cores, and the first ports and the second ports are non-aggregated ports of the chip.

3. The method of claim 1, further comprising:
    identifying k cores of the chip using k third unit IDs in the c unit IDs if c is larger than k which is the number of cores of the chip;
    wherein the plural first ports are plural external ports of the chip, the first unit ID is a unit ID in the third unit IDs;
    the plural second ports are plural internal ports of the chip, the second unit ID is a unit ID other than the third unit IDs in the c unit IDs.

4. The method of claim 1, wherein determining by the member device the value c which is the number of unit IDs to be allocated to the chip comprises:
    identifying a value k which is the number of cores in the chip and a value p which is the number of ports of the chip;
    determining c=k if p/k is smaller than or equal to $2^n$, wherein $2^n$ is smaller than or equal to a pre-determined maximum number of non-aggregated ports allowed to be supported by a chip;
    determining c=2k if p/k is larger than $2^n$.

5. The method of claim 4, further comprising:
checking, by the member device, whether there are c unoccupied unit IDs in unit IDs allocated to the member device;
selecting c unoccupied unit IDs from the unit IDs allocated to the member device and allocating the selected c unit IDs to the chip if there are c unoccupied unit IDs;
inhibiting an interface board which includes the chip from starting up if there are not c unoccupied unit IDs.

6. A member device in a stack, comprising a processor and a memory which stores machine-readable instructions executable by the processor to:
determine a value c which is the number of unit IDs to be allocated to an interface board in the member device, wherein c is larger than 1;
generate a system port identity which identifies a port in the stack for each of plural first ports of the chip using a first unit ID in the c unit IDs; and
generate a system port identity for each of plural second ports of the chip other than the first ports using a second unit ID in the c unit IDs.

7. The member device of claim 6, wherein the machine-readable instructions are executable by the processor to:
identify k cores of the chip using the c unit IDs respectively if c equals k which is the number of cores of the chip;
wherein the first unit ID is a unit ID of a first core in the k cores, the second unit ID is a unit ID of a second core in the k cores, and the first ports and the second ports are non-aggregated ports of the chip.

8. The member device of claim 6, wherein the machine-readable instructions are executable by the processor to:
identify k cores of the chip using k third unit IDs in the c unit IDs if c is larger than k which is the number of cores of the chip;
wherein the plural first ports are plural external ports of the chip, the first unit ID is a unit ID of the third unit IDs;
the plural second ports are plural internal ports of the chip, the second unit ID is a unit ID other than the third unit IDs in the c unit IDs.

9. The member device of claim 6, wherein the machine-readable instructions are executable by the processor to:
identify a value k which is the number of cores in the chip and a value p which is the number of ports of the chip;
determine c=k if p/k is smaller than or equal to $2^n$, wherein $2^n$ is smaller than or equal to a pre-determined maximum number of non-aggregated ports allowed to be supported by a chip; and
determine c=2k if p/k is larger than $2^n$.

10. The member device of claim 9, wherein the machine-readable instructions are executable by the processor to:
check whether there are c unoccupied unit IDs in unit IDs allocated to the member device;
select c unoccupied unit IDs from the unit IDs allocated to the member device and allocate the selected c unit IDs to the chip if there are c unoccupied unit IDs; and
inhibit an interface board which includes the chip from starting up if there are not c unoccupied unit IDs.

11. A machine-readable storage medium, storing instructions executable by at least one processor to:
determine a value c which is the number of unit IDs to be allocated to an interface board in the member device, wherein c is larger than 1;
generate a system port identity which identifies a port in the stack for each of plural first ports of the chip using a first unit ID in the c unit IDs; and
generate a system port identity for each of plural second ports of the chip other than the first ports using a second unit ID in the c unit IDs.

12. The machine-readable storage medium of claim 11, wherein the machine-readable instructions are executable by the processor to:
identify k cores of the chip using the c unit IDs respectively if c equals k which is the number of cores of the chip;
wherein the first unit ID is a unit ID of a first core in the k cores, the second unit ID is a unit ID of a second core in the k cores, and the first ports and the second ports are non-aggregated ports of the chip.

13. The machine-readable storage medium of claim 11, wherein the machine-readable instructions are executable by the processor to:
identify k cores of the chip using k third unit IDs in the c unit IDs if c is larger than k which is the number of cores of the chip;
wherein the plural first ports are plural external ports of the chip, the first unit ID is a unit ID of the third unit IDs;
the plural second ports are plural internal ports of the chip, the second unit ID is a unit ID other than the third unit IDs in the c unit IDs.

14. The machine-readable storage medium of claim 11, wherein the machine-readable instructions are executable by the processor to:
identify a value k which is the number of cores in the chip and a value p which is the number of ports of the chip;
determine c=k if p/k is smaller than or equal to $2^n$, wherein $2^n$ is smaller than or equal to a pre-determined maximum number of non-aggregated ports allowed to be supported by a chip; and
determine c=2k if p/k is larger than $2^n$.

15. The machine-readable storage medium of claim 14, wherein the machine-readable instructions are executable by the processor to:
check whether there are c unoccupied unit IDs in unit IDs allocated to the member device;
select c unoccupied unit IDs from the unit IDs allocated to the member device and allocate the selected c unit IDs to the chip if there are c unoccupied unit IDs ; and
inhibit an interface board which includes the chip from starting up if there are not c unoccupied unit IDs.

* * * * *